US012761937B2

(12) United States Patent
Yang et al.

(10) Patent No.: US 12,761,937 B2
(45) Date of Patent: Oct. 13, 2026

(54) HYPERVISOR HOST DEPLOYMENT IN A CLOUD

(71) Applicant: VMware, Inc., Palo Alto, CA (US)

(72) Inventors: Jianping Yang, San Jose, CA (US); Alexander N. Tessmer, Sun Prairie, WI (US); Vidhyasankari Sriramulu, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 572 days.

(21) Appl. No.: 18/298,968

(22) Filed: Apr. 11, 2023

(65) Prior Publication Data

US 2024/0345859 A1 Oct. 17, 2024

(51) Int. Cl.
*G06F 9/455* (2018.01)

(52) U.S. Cl.
CPC .................... *G06F 9/45558* (2013.01); *G06F 2009/45587* (2013.01); *G06F 2009/45595* (2013.01)

(58) Field of Classification Search
CPC ....... G06F 9/45558; G06F 2009/45587; G06F 2009/45595; G06F 8/63; G06F 9/45541; G06F 8/60
See application file for complete search history.

(56) References Cited

U.S. PATENT DOCUMENTS 9,940,148 B1 * 4/2018 Dannowski ............. G06F 8/656
2010/0070970 A1 * 3/2010 Hu ...................... G06F 9/45533 718/1
2011/0258701 A1 * 10/2011 Cruz ..................... G06F 21/564 718/1
2013/0290694 A1 * 10/2013 Civilini ............... H04L 41/0806 713/2
2014/0317394 A1 * 10/2014 Buhler .................. G06F 9/4416 713/2
2015/0046921 A1 * 2/2015 Allen .................... G06F 9/4406 718/1
2015/0301850 A1 * 10/2015 Jeong .................. G06F 9/45558 718/1
2017/0109190 A1 * 4/2017 Sha ..................... G06F 9/45558
2018/0246747 A1 * 8/2018 Asayag ................. G06F 3/0482
2021/0058388 A1 * 2/2021 Knotwell ............ G06F 9/45558
2022/0103433 A1 * 3/2022 Akhilesham ........ H04L 41/0897

OTHER PUBLICATIONS

Extended European Search Report mailed Aug. 13, 2024 in European Patent Application No. 24167572.7, 9 pages.

* cited by examiner

*Primary Examiner* — Dong U Kim
(74) *Attorney, Agent, or Firm* — Kim & Stewart LLP

(57) ABSTRACT

An example method of deploying a hypervisor to a host in a public cloud includes: obtaining, by a deployment service, a prototype hypervisor image from shared storage; obtaining, by the deployment service, configuration information for the host and a physical network of the public cloud to which the host is attached; customizing, by the deployment service, the prototype hypervisor image in response to the configuration information to generate a customized hypervisor image; storing, by the deployment service, the customized hypervisor image in the shared storage in a manner accessible by the public cloud; and invoking a deployment application programming interface (API) of the public cloud to retrieve and install the customized hypervisor image to the host.

20 Claims, 4 Drawing Sheets

HYPERVISOR HOST DEPLOYMENT IN A CLOUD

BACKGROUND

In a software-defined data center (SDDC), virtual infrastructure, which includes virtual compute, storage, and networking resources, is provisioned from hardware infrastructure that includes a plurality of host computers, storage devices, and networking devices. The provisioning of the virtual infrastructure is carried out by management software that communicates with virtualization software (e.g., hypervisor) installed in the host computers. Applications execute in virtual computing instances supported by the virtualization software, such as virtual machines (VMs) and/or containers.

Users can subscribe to a public cloud to provision applications, virtualized infrastructure, or an entire SDDC, depending on the subscription model. In a software-as-a-service (SaaS) model, for example, a user consumes applications executing in the public cloud, where the public cloud provider manages the applications, data, any runtime/middleware layers, operating system (OS) layer, virtualization layer, and hardware (servers, storage, networking). In an infrastructure-as-a-service model (IaaS), the subscription allows the user to manage applications, data, any runtime/middleware layers, and OS layer. In the IaaS model, the public cloud provider manages the virtualization layer and hardware (servers, storage, networking). In yet another recent model, a subscription allows the user to manage the virtualization layer in addition to the typical IaaS layers (referred to as a bring-your-own-host (BYOH) model). In the BYOH model, the public cloud provider manages only the hardware (servers, storage, and networking) while providing the user bare-metal hosts on which to deploy their own virtualization software (hypervisors). As such, the user must adapt the virtualization software installation to conform to the hardware configuration (e.g., server configuration, underlay network configuration, etc.).

SUMMARY

In an embodiment, a method of deploying a hypervisor to a host in a public cloud, comprising: obtaining, by a deployment service, a prototype hypervisor image from shared storage; obtaining, by the deployment service, configuration information for the host and a physical network of the public cloud to which the host is attached; customizing, by the deployment service, the prototype hypervisor image in response to the configuration information to generate a customized hypervisor image; storing, by the deployment service, the customized hypervisor image in the shared storage in a manner accessible by the public cloud; and invoking a deployment application programming interface (API) of the public cloud to retrieve and install the customized hypervisor image to the host.

Further embodiments include a non-transitory computer-readable storage medium comprising instructions that cause a computer system to carry out the above method, as well as a computer system configured to carry out the above method.

DETAILED DESCRIPTION

Hypervisor host deployment in a cloud is described. In embodiments, a subscription in a public cloud provides a user with bare-metal hosts on which to install virtualization software (hypervisors). A "bare-metal" host is a server on which the user can install host software (a hypervisor) that executes directly on the hardware platform thereof. The bare metal hosts are connected to a physical network. The public cloud provider manages the bare-metal hosts and the physical network to which they are connected (e.g., a BYOH subscription model). The user operates or otherwise has access to compute resources that can store hypervisor images and execute an application programing interface (API) and service(s) for retrieving, modifying, and storing hypervisor images. In embodiments, a user operates or has access to a data center having shared storage for storing hypervisor images and host(s) for executing an API and services for managing the hypervisor images. The shared storage can store a prototype hypervisor image. A user or software can access a service through an API to customize the prototype hypervisor image for installation on the bare-metal hosts in the public cloud. Customizations can include, for example, configuring the image to adapt to hardware configurations of the bare-metal hosts and underlay network to which the bare-metal hosts are connected. Customizations can further include settings that enable specific network services, set default credentials, and the like. The customized hypervisor image is stored in the shared storage and made accessible to a deployment API in the public cloud for installation of the customized hypervisor image on the bare-metal hosts. Once installed and booted, the user can access the hypervisor to perform additional configuration (e.g., adding the hosts to a cluster managed by a virtualization management server). These and further aspects are described below with respect to the drawings.

Figure 1:
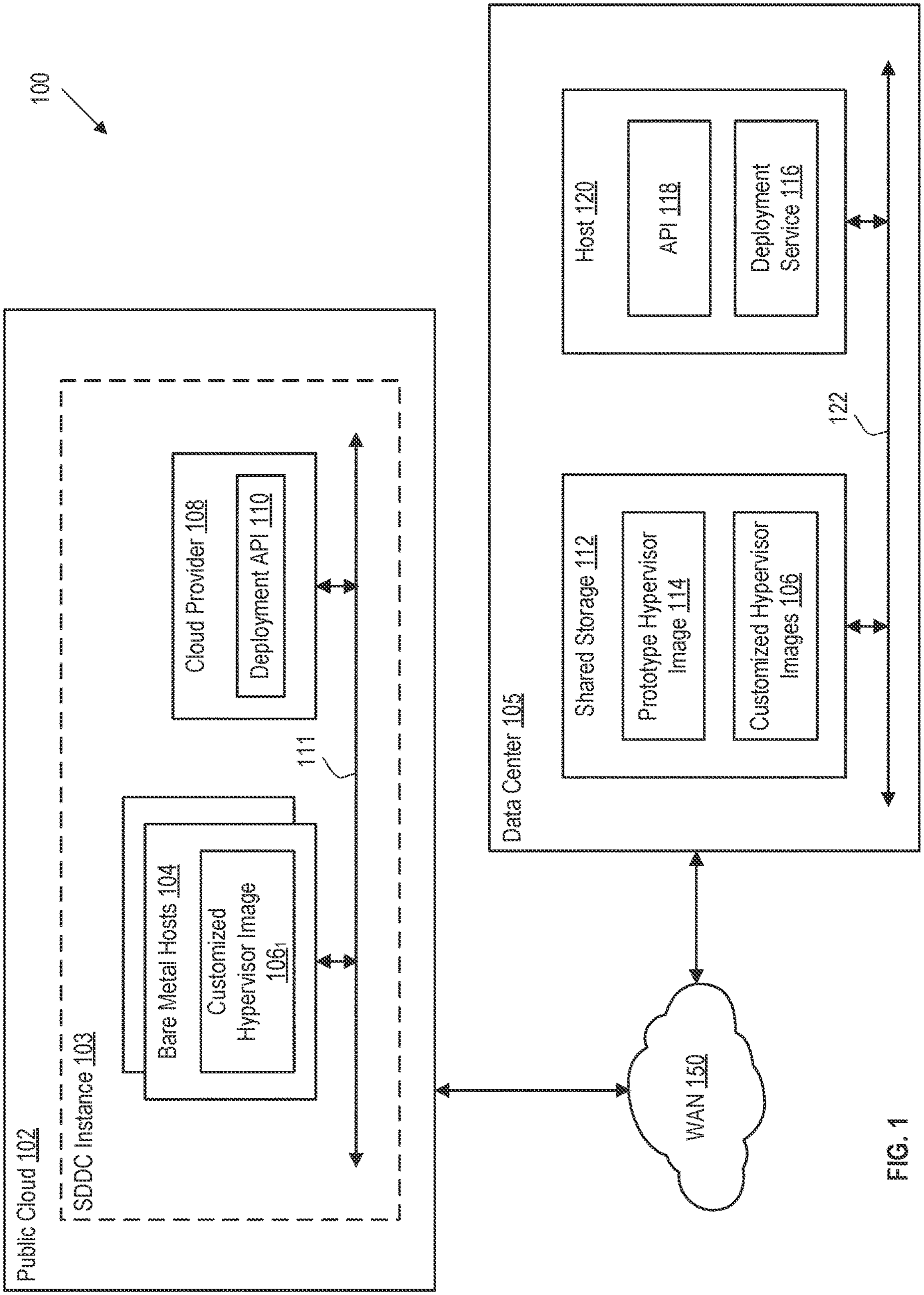
FIG. 1 is a block diagram depicting a computing system according to embodiments.

FIG. 1 is a block diagram depicting a computing system 100 according to embodiments. Computing system 100 includes a public cloud 102 and a data center 105 connected to a wide area network (WAN) 150, such as the public Internet. Data center 105 can be, for example, an on-premises data center operated and controlled by a user (a private cloud). Data center 105 includes a host 120 and shared storage 112. Host 120 is a server configured to execute software, including an application programming interface (API) 118 and a deployment service 116. Host 120 is connected to a physical network 122. Host 120 accesses shared storage 112 over network 122. Shared storage 112 includes one or more storage arrays, such as a storage area network (SAN), network attached storage (NAS), or the like. Shared storage 112 may comprise magnetic disks, solid-state disks, flash memory, and the like, as well as combination thereof. In some embodiments, local storage in host and/or other hosts (not shown) can be aggregated and provisioned as part of a virtual SAN, which is another form of shared storage.

The user obtains a subscription in public cloud 102 for a software-defined data center (SDDC) instance 103 comprising bare metal hosts 104 and a cloud provider 108 having a deployment API 110. Cloud provider 108 and deployment API 110 comprise software executing on host(s) provided by public cloud. The user or software uses deployment API 110 to deploy hypervisor images on bare-metal hosts 104. Bare metal hosts 104 and cloud provider 108 are connected to a physical network 111.

Shared storage 112 stores a prototype hypervisor image 114. A hypervisor image includes a collection of software to be installed on a host to implement a hypervisor. A hypervisor image includes a plurality of components, each of which includes one or more software installation bundles (SIBs). The components can be logically organized into component collections, such as a base image, add-ons, firmware/drivers, and the like.

According to embodiments, SIBs are logically grouped into "components." Each SIB includes metadata (e.g., included in an extensible markup language (XML) file), a signature, and one or more payloads. A payload includes a file archive. In the embodiments, a component is a unit of shipment and installation, and a successful installation of a component typically will appear to the end user as enabling some specific feature of a hypervisor For example, if a software vendor wants to ship a user-visible feature that requires a plug-in, a driver, and a solution, the software vendor will create separate SIBs for each of the plug-in, the driver, and the solution, and then group them together as one component. From the end user's perspective, it is sufficient to install this one component onto a server to enable this feature on the server. A component may be part of a collection, such as a base image or an add-on, as further described below, or it may be a stand-alone component provided by a third-party or the end user.

A "base image" is a collection of components that are sufficient to boot up a server with the virtualization software. For example, the components for the base image include a core kernel component and components for basic drivers and in-box drivers. The core kernel component is made up of a kernel payload and other payloads that have inter-dependencies with the kernel payload. According to embodiments, the collection of components that make up the base image is packaged and released as one unit.

An "add-on" or "add-on image" is a collection of components that an original equipment manufacturer (OEM) wants to bring together to customize its servers. Using add-ons, the OEM can add, update or remove components that are present in the base image. The add-on is layered on top of the base image and the combination includes all the drivers and solutions that are necessary to customize, boot up and monitor the OEM's servers. Although an "add-on" is always layered on top of a base image, the add-on content and the base image content are not tied together. As a result, an OEM is able to independently manage the lifecycle of its releases. In addition, end users can update the add-on content and the base image content independently of each other.

"Solutions" are features that indirectly impact the desired image when they are enabled by the end user. In other words, the end-user decides to enable the solution in a user interface but does not decide what components to install. The solution's management layer decides the right set of components based on constraints. Examples solutions include HA (high availability) and a network virtualization platform.

Prototype hypervisor image 114 is configured to be installed on some hosts, such as host 120 or other hosts in data center 105. In embodiments, prototype hypervisor image 114 requires customization to be installed on and execute on bare metal hosts 104 of public cloud 102. The user or software interacts with deployment service 116 through API 118 to customize prototype hypervisor image 114 and generate customized hypervisor images 106. Deployment service 116 makes customized hypervisor images 106 accessible through WAN 150. The user or software interacts with deployment API 110 to deploy one of customized hypervisor images 106 (e.g., customized hypervisor image 1061) to each bare metal hosts 104. Deployment API 110 installs customized hypervisor image 1061 to each bare metal host 104 and starts each bare metal host 104. The user can then access hypervisors executing on bare metal hosts 104 and perform further configuration (e.g., form a host cluster managed by virtualization management software, network management software, etc., deploy and executing virtual computing instances, deploy and execute applications in the virtual computing instances, etc.). Example customizations applied to prototype hypervisor image 114 are discussed below.

Figure 2:
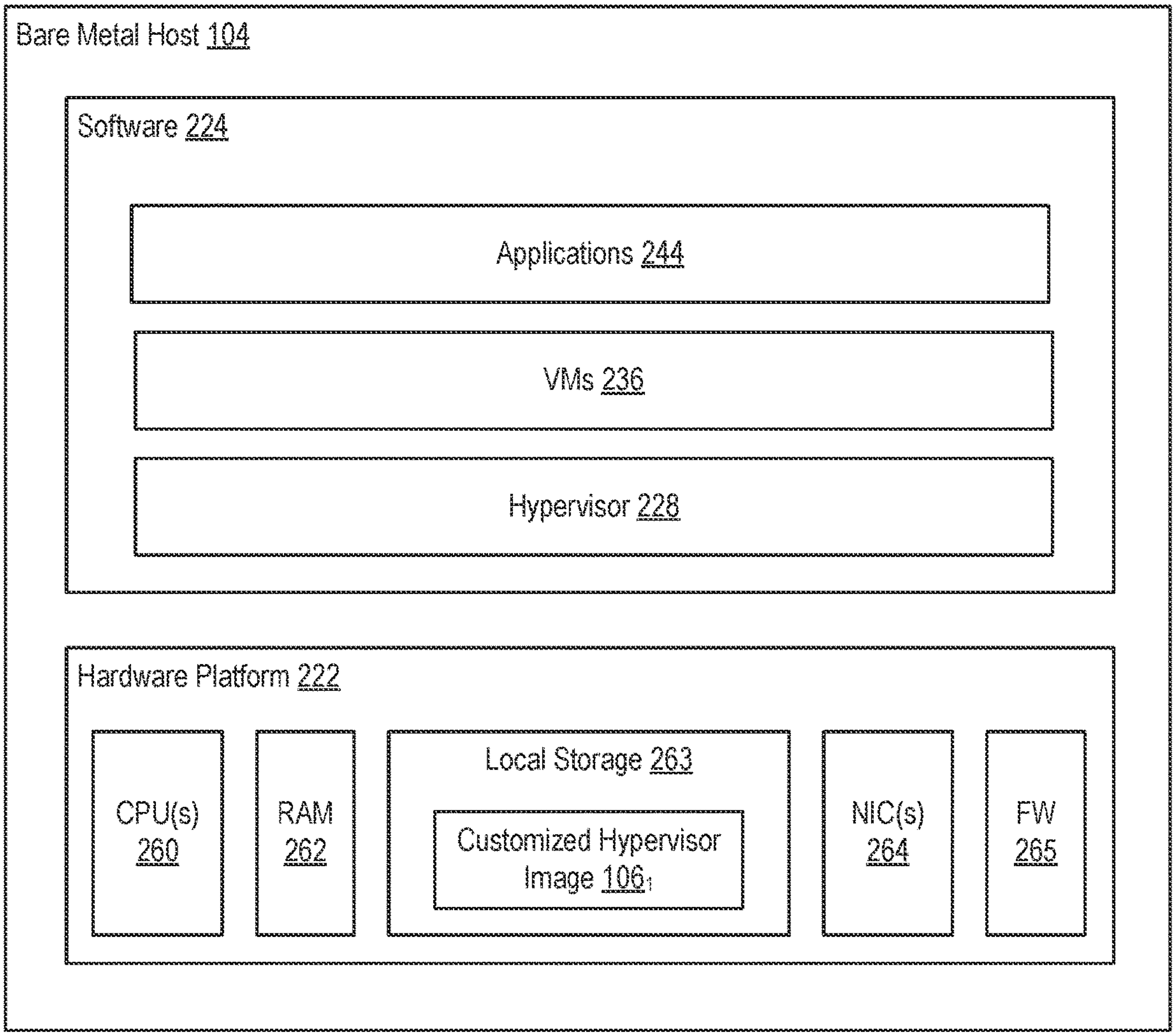
FIG. 2 is a block diagram depicting a bare metal host according to embodiments.

FIG. 2 is a block diagram depicting a bare metal host 104 according to embodiments. Bare metal host 104 may be constructed on hardware platforms such as an x86 architecture platforms, ARM architecture platforms, or the like. As shown, a hardware platform 222 of bare metal host 104 includes conventional components of a computing device, such as one or more central processing units (CPUs) 260, system memory (e.g., random access memory (RAM) 262), one or more network interface controllers (NICs) 264, local storage 263, and firmware (FW) 265. CPUs 260 are configured to execute instructions, for example, executable instructions that perform one or more operations described herein, which may be stored in RAM 262. NICs 264 enable bare metal host 104 to communicate with other devices through physical network 111. FW 265 is executed by CPUs 260 to boot the host and provide control of hardware platform 222.

Software 224 of bare metal host 104 provides a virtualization layer, referred to herein as a hypervisor 228, which directly executes on hardware platform 222. In an embodiment, there is no intervening software, such as a host operating system (OS), between hypervisor 228 and hardware platform 222. Thus, hypervisor 228 is a Type-1 hypervisor (also known as a "bare-metal" hypervisor). As a result, hypervisor 228 is a bare-metal virtualization layer executing directly on host hardware platforms Hypervisor 228 abstracts processor, memory, storage, and network resources of hardware platform 222 to provide a virtual machine execution space within which multiple virtual machines (VM) 236 may be concurrently instantiated and executed. Applications 244 execute in VMs 236.

Bare metal host 104 stores customized hypervisor image 1061. CPU(s) 260 execute FW 265 during boot, which loads customized hypervisor image 106; to execute hypervisor 228. Customized hypervisor image 106; can be stored in local storage 263.

Figure 3:
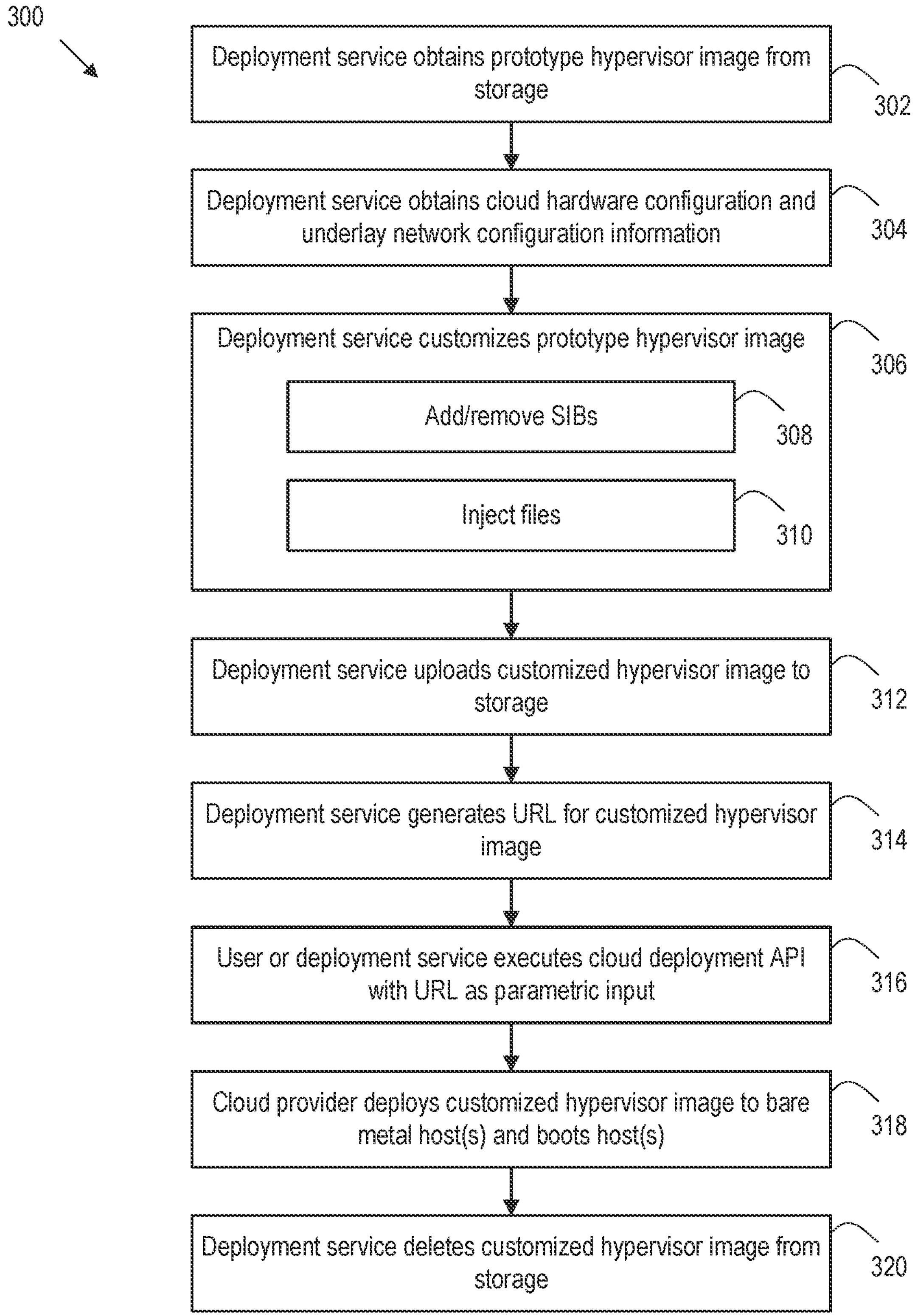
FIG. 3 is a flow diagram depicting a method of customizing a hypervisor image for installation on bare metal hosts of a public cloud according to embodiments.

FIG. 3 is a flow diagram depicting a method 300 of customizing an hypervisor image for installation on bare metal hosts of a public cloud according to embodiments. Method 300 begins at step 302, where deployment service 116 obtains prototype hypervisor image 114 from shared storage 112. At step 304, deployment service 116 obtains cloud hardware configuration and underly network configuration information. For example, a user or software can supply this information through API 118. The information can include a configuration of host hardware (e.g., which devices are present, which drivers are required, configuration settings for devices, etc.) and a configuration of the underlay network (e.g., internet protocol (IP) addresses, virtual local area network (VLAN) configurations, etc.).

At step 306, deployment service 116 customizes prototype hypervisor image 114. For example, at step 308, deployment service 116 can add and/or remove SIBs from prototype hypervisor image 114 to match the hardware configuration of the bare metal host. In another example, at step 310, deployment service 116 can inject files and/or modify files in the prototype image, such as configuration files. At step 312, deployment service 116 uploads customized hypervisor image 106 to shared storage 112. At step 314, deployment service 116 generates a uniform resource locator (URL) for customized hypervisor image 106 that allows access to customized hypervisor image 106 through WAN 150.

At step 316, the user or deployment service 116 executes deployment API 110 with URL as parametric input. At step 318, cloud provider 108 deploys customized hypervisor image 1061 to bare metal host(s) 104 and starts hosts 104. At step 320, deployment service 116 deletes customized hypervisor image 1061 from shared storage 112.

Figure 4:
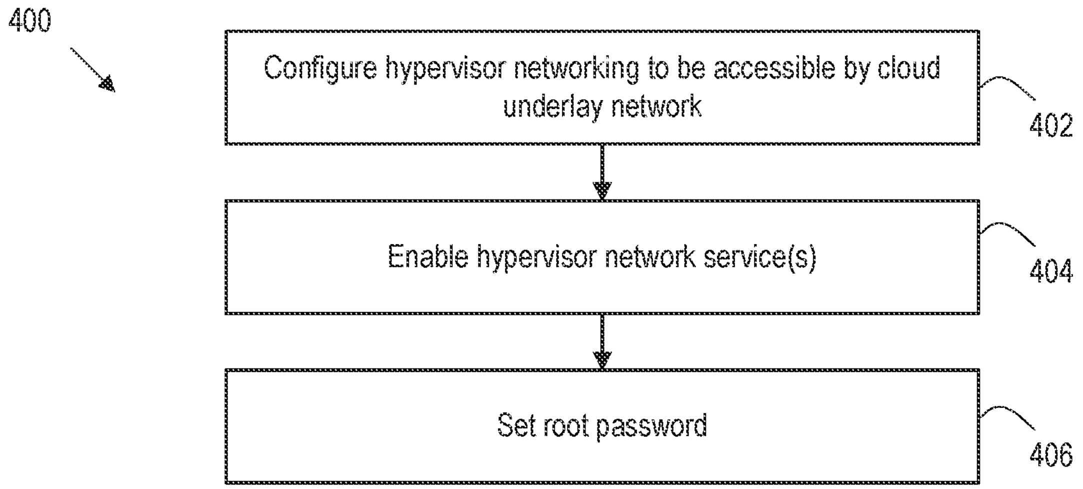
FIG. 4 is a flow diagram depicting a method of customizing a prototype hypervisor image according to embodiments.

FIG. 4 is a flow diagram depicting a method 400 of customizing a prototype hypervisor image according to embodiments. Method 400 begins at step 402, where deployment service 116 configures hypervisor networking to be accessible by cloud underlay network. For example, such configuration can include setting an IP address, setting a VLAN, and the like. At step 404, deployment service 116 enables one or more hypervisor network services. For example, deployment service can enable secure shell (SSH) service. At step 406, deployment service sets a root password for the hypervisor. Steps 402 through 406 can be implemented by modifying and/or injecting files into prototype hypervisor image 114.

While some processes and methods having various operations have been described, one or more embodiments also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Certain embodiments as described above involve a hardware abstraction layer on top of a host computer. The hardware abstraction layer allows multiple contexts to share the hardware resource. These contexts can be isolated from each other, each having at least a user application running therein. The hardware abstraction layer thus provides benefits of resource isolation and allocation among the contexts. Virtual machines may be used as an example for the contexts and hypervisors may be used as an example for the hardware abstraction layer. In general, each virtual machine includes a guest operating system in which at least one application runs. It should be noted that, unless otherwise stated, one or more of these embodiments may also apply to other examples of contexts, such as containers. Containers implement operating system-level virtualization, wherein an abstraction layer is provided on top of a kernel of an operating system on a host computer or a kernel of a guest operating system of a VM. The abstraction layer supports multiple containers each including an application and its dependencies. Each container runs as an isolated process in user-space on the underlying operating system and shares the kernel with other containers. The container relies on the kernel's functionality to make use of resource isolation (CPU, memory, block I/O, network, etc.) and separate namespaces and to completely isolate the application's view of the operating environments. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Boundaries between components, operations, and data stores are somewhat arbitrary, and particular operations are illustrated in the context of specific configurations. Other allocations of functionality are envisioned and may fall within the scope of the appended claims. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of deploying a hypervisor to a host in a public cloud, comprising:

obtaining, by a deployment service, a prototype hypervisor image from shared storage, the prototype hypervisor image being for a bare-metal hypervisor to be executed directly on a hardware platform of the host for execution of virtual machines (VMs) on the bare-metal hypervisor;

obtaining, by the deployment service, configuration information for devices of the hardware platform of the host and a physical network of the public cloud to which the host is attached;

customizing, by the deployment service, the prototype hypervisor image in response to the configuration information to generate a customized hypervisor image, the customized hypervisor image comprising a modification of the bare-metal hypervisor based on the configuration information, the modification including at least one software installation bundle (SIB) corresponding to the hardware platform of the host and configuration of the physical network of the public cloud to which the host is attached;

storing, by the deployment service, the customized hypervisor image in the shared storage in a manner accessible by the public cloud; and invoking a deployment application programming interface (API) of the public cloud to retrieve and install the customized hypervisor image to the host.

2. The method of claim 1, wherein the shared storage is part of a data center in communication with the public cloud through a wide area network (WAN), and wherein the deployment service executes on a virtualized host in the data center.

3. The method of claim 1, wherein the configuration information includes information related to at least one of an internet protocol (IP) address and a virtual local area network (VLAN) of the physical network.

4. The method of claim 1, where the customizing comprises at least one of: adding or removing the software installation bundle (SIB) to or from the prototype hypervisor image; and adding or modifying a file to or in the prototype hypervisor image.

5. The method of claim 1, wherein the customizing comprises:

configuring hypervisor network to be accessible by the physical network of the public cloud;

enabling one or more hypervisor network services; and setting a root password of the hypervisor.

6. The method of claim 1, wherein the storing comprises:

generating a uniform resource locator (URL) for the customized hypervisor image accessible by the public cloud for retrieving the customized hypervisor image.

7. The method of claim 1, wherein the configuration information for the devices of the hardware platform of the host includes configuration information of a central processing unit (CPU), a random access memory (RAM), a network interface controller (NIC), a local storage, and firmware of the host.

8. A non-transitory computer readable medium comprising instructions to be executed in a computing device to cause the computing device to carry out a method of deploying a hypervisor to a host in a public cloud, comprising:

obtaining, by a deployment service, a prototype hypervisor image from shared storage, the prototype hypervisor image being for a bare-metal hypervisor to be executed directly on a hardware platform of the host for execution of virtual machines (VMs) on the bare-metal hypervisor;

obtaining, by the deployment service, configuration information for devices of the hardware platform of the host and a physical network of the public cloud to which the host is attached;

customizing, by the deployment service, the prototype hypervisor image in response to the configuration information to generate a customized hypervisor image, the customized hypervisor image comprising a modification of the bare-metal hypervisor based on the configuration information, the modification including at least one software installation bundle (SIB) corresponding to the hardware platform of the host and configuration of the physical network of the public cloud to which the host is attached;

storing, by the deployment service, the customized hypervisor image in the shared storage in a manner accessible by the public cloud; and invoking a deployment application programming interface (API) of the public cloud to retrieve and install the customized hypervisor image to the host.

9. The non-transitory computer readable medium of claim 8, wherein the shared storage is part of a data center in communication with the public cloud through a wide area network (WAN), and wherein the deployment service executes on a virtualized host in the data center.

10. The non-transitory computer readable medium of claim 8, wherein the configuration information includes information related to at least one of an internet protocol (IP) address and a virtual local area network (VLAN) of the physical network.

11. The non-transitory computer readable medium of claim 8, where the customizing comprises at least one of: adding or removing the software installation bundle (SIB) to or from the prototype hypervisor image; and adding or modifying a file to or in the prototype hypervisor image.

12. The non-transitory computer readable medium of claim 8, wherein the customizing comprises:

configuring hypervisor network to be accessible by the physical network of the public cloud;

enabling one or more hypervisor network services; and setting a root password of the hypervisor.

13. The non-transitory computer readable medium of claim 8, wherein the storing comprises:

generating a uniform resource locator (URL) for the customized hypervisor image accessible by the public cloud for retrieving the customized hypervisor image.

14. The non-transitory computer readable medium of claim 8, wherein the configuration information for the devices of the hardware platform of the host includes configuration information of a central processing unit (CPU), a random access memory (RAM), a network interface controller (NIC), a local storage, and firmware of the host.

15. A computing system, comprising:

a public cloud in communication with a data center through a wide area network (WAN);

a deployment service, executing in the data center, configured to:

obtain a prototype hypervisor image from shared storage in the data center, the prototype hypervisor image being for a bare-metal hypervisor to be executed directly on a hardware platform of the host for execution of virtual machines (VMs) on the bare-metal hypervisor;

obtain configuration information for devices of the hardware platform of a host and a physical network of the public cloud to which the host is attached;

customize the prototype hypervisor image in response to the configuration information to generate a customized hypervisor image, the customized hypervisor image comprising a modification of the bare-metal hypervisor based on the configuration information, the modification including at least one software installation bundle (SIB) corresponding to the hardware platform of the host and configuration of the physical network of the public cloud to which the host is attached;

store the customized hypervisor image in the shared storage in a manner accessible by the public cloud;

wherein a deployment application programming interface (API) is configured to retrieve and install the customized hypervisor image to a host in the public cloud.

16. The computing system of claim 15, wherein the shared storage is part of a data center in communication with the public cloud through a wide area network (WAN), and wherein the deployment service executes on a virtualized host in the data center.

17. The computing system of claim 15, wherein the configuration information includes information related to at least one of an internet protocol (IP) address and a virtual local area network (VLAN) of the physical network.

18. The computing system of claim 15, wherein the deployment service is configured to customize by at least one of: adding or removing the software installation bundle (SIB) to or from the prototype hypervisor image; and adding or modifying a file to or in the prototype hypervisor image.

19. The computing system of claim 15, wherein the deployment service is configured to customize the prototype hypervisor image by:

configuring hypervisor network to be accessible by the physical network of the public cloud;

enabling one or more hypervisor network services; and setting a root password of the hypervisor.

20. The computing system of claim 15, wherein the configuration information for the devices of the hardware platform of the host includes configuration information of a central processing unit (CPU), a random access memory (RAM), a network interface controller (NIC), a local storage, and firmware of the host.

* * * * *